(12) United States Patent
Zhang et al.

(10) Patent No.: US 12,495,764 B1
(45) Date of Patent: Dec. 16, 2025

(54) FULLY AUTOMATIC PET FEEDER WITH DRYING BIN

(71) Applicant: Shenzhen Shouzheng Chuqi Technology Co., Ltd., Shenzhen (CN)

(72) Inventors: Yuyang Zhang, Shenzhen (CN); Xiangli Zhang, Shenzhen (CN)

(*) Notice: Subject to any disclaimer, the term of this patent is extended or adjusted under 35 U.S.C. 154(b) by 0 days.

(21) Appl. No.: 18/888,436

(22) Filed: Sep. 18, 2024

(51) Int. Cl.
*A01K 5/02* (2006.01)

(52) U.S. Cl.
CPC .......... *A01K 5/0225* (2013.01); *A01K 5/0275* (2013.01)

(58) Field of Classification Search
CPC .............................. A01K 5/0225; A01K 5/0275
See application file for complete search history.

(56) References Cited

U.S. PATENT DOCUMENTS

| | | | | |
|---|---|---|---|---|
| 12,102,064 B1* | 10/2024 | Yang | ..................... | A01K 5/0114 |
| 2020/0100459 A1* | 4/2020 | Chen | ..................... | A01K 5/0225 |
| 2021/0204511 A1* | 7/2021 | Chen | ..................... | A01K 5/0225 |
| 2021/0307289 A1* | 10/2021 | Baxter | ................. | A01K 5/0225 |
| 2022/0117194 A1* | 4/2022 | Huang | ..................... | A01K 5/00 |
| 2022/0312727 A1* | 10/2022 | Zhang | ................. | A01K 5/0225 |
| 2023/0157258 A1* | 5/2023 | Chen | ..................... | A01K 5/0225 119/57.92 |
| 2023/0180714 A1* | 6/2023 | Wu | ....................... | A01K 5/0142 119/57 |
| 2023/0225370 A1* | 7/2023 | Yu | ........................ | A01K 5/0225 119/52.1 |
| 2023/0240257 A1* | 8/2023 | Zhang | ................. | A01K 5/0114 119/61.5 |
| 2023/0292703 A1* | 9/2023 | Harper | ................. | A01K 5/0114 119/51.01 |
| 2024/0156051 A1* | 5/2024 | Kuster | ................. | A01K 5/0291 |
| 2024/0268341 A1* | 8/2024 | Sides | ................... | A01K 5/0114 |
| 2024/0306601 A1* | 9/2024 | Wu | ....................... | A01K 5/0291 |
| 2025/0120363 A1* | 4/2025 | Baxter | ................. | A01K 5/0225 |

* cited by examiner

*Primary Examiner* — Jessica B Wong
(74) *Attorney, Agent, or Firm* — Daniel M. Cohn; Howard M. Cohn

(57) ABSTRACT

The present disclosure provides a fully automatic pet feeder, comprising: a storage cabin is provided with a drying component for maintaining dryness in the storage cabin; a feed inlet of the feed distributing device is provided at the bottom of the storage cabin and is connected to the storage cabin, the feed distributing device quantitatively separates the pet feed that slides in from the feed inlet, and then discharges the separated pet feed from a feed outlet of the feed distributing device; a feeding bowl is provided adjacent to the feed outlet, so that the pet feed discharged from the feed outlet falls into the feeding bowl; a control module is electrically connected to the feed distributing device, the control module is used to receive external input signals and control the feed distributing device to distribute pet feed in a timely and/or quantitative manner according to the external input signals.

10 Claims, 10 Drawing Sheets

FULLY AUTOMATIC PET FEEDER WITH DRYING BIN

TECHNICAL FIELD

The present disclosure relates to a technical field of pet feeding devices, and in particular to a fully automatic pet feeder.

BACKGROUND

With the improvement of living standards, more and more users are willing to relieve the pressure of life and work by raising pets. Pets are creatures that people keep for spiritual purposes. Now the pet industry has become an emerging and vibrant project, and the feeding of pets has become crucial. Therefore, designing an automatic pet feeder that can autonomously feed pets has considerable economic and practical value. However, the inventors have found that most of the conventional automatic pet feeders use an hourglass structure or a motor driven structure. The hourglass feeder is usually provided a feed outlet at the bottom of the storage cabin. A feeding bowl is arranged at the feed outlet, and the feed automatically slides down and is replenished under the action of gravity. It has the advantages of simple structure and low price. However, the hourglass structure cannot achieve the timing and quantitative feeding of pets, and it is easy to cause underfeeding or overfeeding. Moreover, the hourglass structure has poor moisture resistance, which is not conducive to the storage of pet feed in the storage cabin. Feeders with motor driven structure are generally rotated by motor, and uses a brush to push the pet feed in the storage cabin to the feed outlet and then drops it into the feeding bowl, which can achieve timed feeding, but not quantitative feeding. In addition, it also has the problem of poor moisture resistance, which is not conducive to the storage of pet feed in the storage cabin.

SUMMARY

The present disclosure provides a fully automatic pet feeder, in order to solve the problems that the existing pet feeder cannot feed pets quantitatively and at a fixed time and has poor moisture resistance.

The working process of the fully automatic pet feeder of the present application is as follows: the fully automatic pet feeder, comprising: a storage cabin, a feed distributing device, a feeding bowl, a control module; wherein: the storage cabin is provided with a drying component for maintaining dryness in the storage cabin; a feed inlet of the feed distributing device is provided at the bottom of the storage cabin and is connected to the storage cabin; the feed distributing device quantitatively separates the pet feed that slides in from the feed inlet, and then discharges the separated pet feed from a feed outlet of the feed distributing device; the feeding bowl is provided adjacent to the feed outlet, so that the pet feed discharged from the feed outlet falls into the feeding bowl; the control module is electrically connected to the feed distributing device, the control module is used to receive external input signals and control the feed distributing device to distribute pet feed in a timely and/or quantitative manner according to the external input signals.

Furthermore, the storage cabin comprises a feed cabin with an open top and a cover movably provided on the top of the feed cabin, the drying component comprises a drying bin for storing desiccant, the drying bin is provided on the inner wall of the cover and is connected with the feed cabin.

Furthermore, the drying bin comprises an upper bin body portion fixedly provided on the inner wall of the cover and a lower bin body portion movably provided on the inner wall of the cover, one end of the lower bin body portion is hinged to the inner wall of the cover, the other end of the lower bin body portion is provided with a locking portion, the interior of the cover is provided with a locking body matching the locking portion, the lower bin body portion is provided with a plurality of ventilation ports connecting with the feed cabin and the drying bin.

Furthermore, the cover is also provided with a groove with an open top, the groove is provided with a hinged portion, the top of the groove is provided with a matching button portion, the lower surface of the button portion is provided with a hinge body hinged to the hinge portion, the hinge body is provided with an extrusion portion, the bottom of the groove is slidably provided with movable latch teeth, the side wall of the groove is provided with a through hole, one end of the movable latch teeth extends from the through hole to the outside of the groove, an elastic member is provided between the other end of the movable latch teeth and the inner wall of the groove, the upper surface of the movable latch teeth is provided with a pressure bearing portion, the extrusion portion abuts against the pressure bearing portion, the button portion rotates when pressed, the extrusion portion rotates and presses the pressure bearing portion to drive the movable latch teeth to slide; the movable latch teeth slides so that one end of the movable latch teeth retracts from the outside of the groove to the inside of the groove, when the button portion is released, the movable latch teeth returns to its original position under the elastic force of the elastic member, one end of the movable latch teeth extends out from the groove, the side wall of the feed cabin is provided with a first bayonet matched with one end of the movable latch teeth, the first bayonet is opposite to the through hole on the side wall of the groove.

Furthermore, the side wall of the cover is also provided with fixed latch teeth, the fixed latch teeth is provided at an end opposite to the movable latch teeth, the side wall of the feed cabin is also provided with a second bayonet matched with the fixed latch teeth.

Furthermore, the bottom of the storage cabin is provided obliquely, and the feed inlet is provided at the lowest point of the bottom of the storage cabin.

Furthermore, the feed distributing device comprises a shell, a cylindrical feed distributing cabin provided in the shell, a driving motor and a rotating shaft, the feed distributing cabin is connected to the bottom of the storage cabin, the driving motor is provided at the bottom end of the feed distributing cabin, the rotating shaft is provided at the center of the feed distributing cabin, and the bottom end of the rotating shaft passes through the bottom end of the feed distributing cabin and is connected to the output end of the driving motor, the feed inlet is provided at the top of the feed distributing cabin, the feed outlet is provided at the bottom of the feed distributing cabin, the feed distributing cabin comprises an upper feed distributing area connected to the feed inlet and a lower feed distributing area connected to the feed outlet, the upper feed distributing area is provided with a pair of blocks, the pair of blocks are connected to the inner wall of the top of the feed distributing cabin and are located at both ends of the feed inlet, the pair of blocks, the inner wall of the feed distributing cabin, and the outer wall of the rotating shaft form a fan-shaped annular accommodating area, the lower feed distributing area is provided with a pair of fan-shaped annular portions, the pair of fan-shaped annular portions are sleeved on the rotating shaft, the pair of fan-shaped annular portions divide the lower feed distributing area into two fan-shaped annular spaces of equal size, the top surface area of the fan-shaped annular spaces are equal to the bottom surface area of the accommodating area, the bottom area of the fan-shaped annular spaces are equal to the size of the feed outlet, when the rotating shaft drives the pair of fan-shaped annular portions to rotate, the two fan-shaped annular spaces are alternately passed below the accommodating area or above the feed outlet, so that the pet feed in the accommodating area falls into the fan-shaped annular space, or the pet feed in the fan-shaped annular space falls from the feed outlet to the feeding bowl.

Furthermore, the feed distributing device also comprises a stirring member, the top end of the rotating shaft passes through the top of the feed distributing cabin and extends into the storage cabin, the stirring member is connected to the top end of the rotating shaft.

Furthermore, the feed distributing device also comprises a counter electrically connected to the control module, the counter is provided on the outer surface of the bottom of the feed distributing cabin, a rotating member is sleeved on a part of rotating shaft area between the bottom of the feed distributing cabin and the driving motor, the rotating member is provided with a protruding portion, the counter is provided with an elastic switch, the elastic switch is located on the rotation track of the protruding portion, when the rotating member drives the protruding portion to rotate and pass the elastic switch, the protruding portion presses the elastic switch, and the counter generates an induction signal and counts once.

Furthermore, the shell is also provided with a battery compartment, the battery compartment is loaded with battery, the battery is electrically connected to the driving motor and the control module.

Furthermore, the control module comprises a mounting plate, a supporting shell, a circuit board, a display screen and a rotator, the shell is provided with a mounting structure matching the mounting plate, one side of the supporting shell is arranged on the mounting plate, the circuit board is arranged in the supporting shell, the display screen is arranged on the other side of the supporting shell, the display screen is covered with a layer of display lens, the display lens is provided with a sensing button, the sensing button is electrically connected to the circuit board, the rotator is movably sleeved on the supporting shell, the circuit board is provided with a sensor, the sensor is provided with a gear, the inner surface of the rotator is provided with a circle of gear teeth which meshes with the gear, the rotator rotates to drive the gear, the gear rotates so that the sensor generates a control signal and transmits it to the circuit board, the circuit board is electrically connected to the driving motor.

Furthermore, the feeding bowl is detachably connected to the feed distributing device.

Furthermore, the storage cabin is detachably connected to the feed distributing device.

The present disclosure has beneficial effects as follows.

The present disclosure provides a fully automatic pet feeder, by setting a drying component in the storage cabin, the drying component is used to keep the storage cabin dry, so that the pet feed stored in the storage cabin can be preserved for a long time. Therefore, the user can add a sufficient amount of pet feed to the storage cabin at one time, without the need to frequently add to storage cabin, the user's experience is better, even if users travel for many days, they don't need to worry about feeding their pets. Moreover, by setting the feed distributing device and the control module, the control module is used to control the operation of the feed distributing device. The pet feed in the storage cabin is added to the feeding bowl in a timely and quantitative manner through the feed distributing device, thereby achieving timely and quantitative feeding of the pet, and different feeding amounts can be set according to the size of the pet, which is highly practical.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
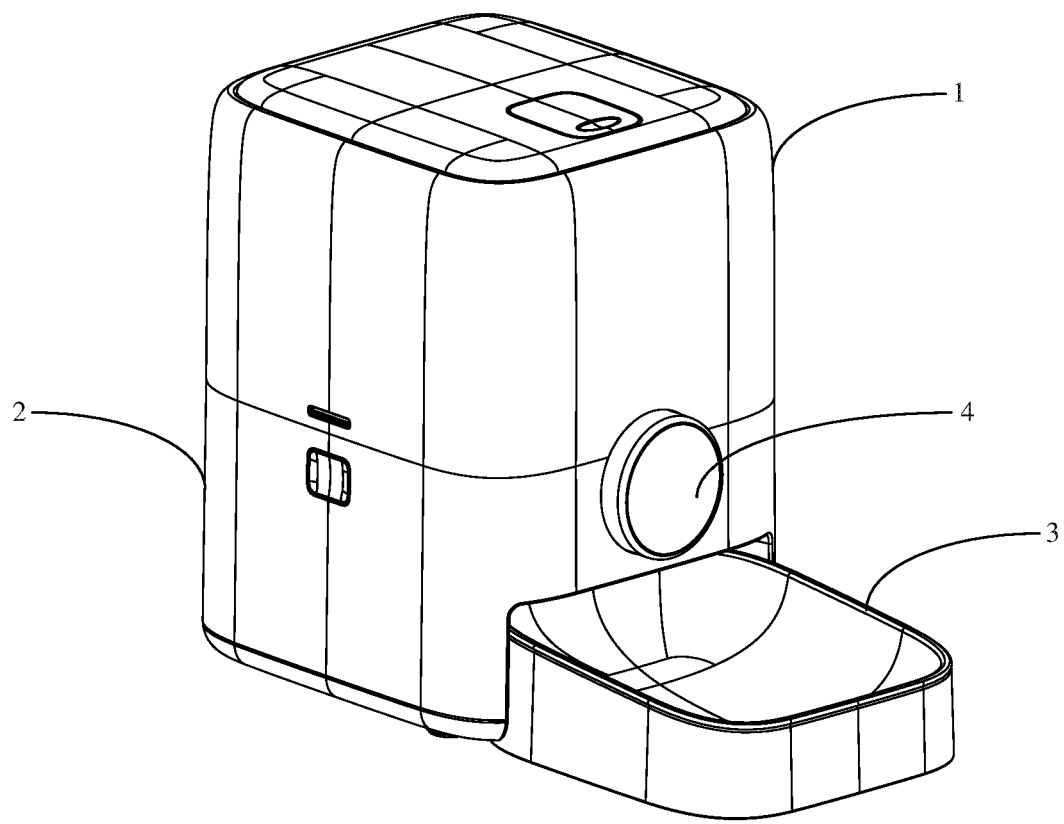
FIG. 1 is a schematic diagram of an embodiment of a fully automatic pet feeder.

| Reference number in the drawings: | | | |
|---|---|---|---|
| storage cabin | 1 | feed distributing device | 2 |
| feeding bowl | 3 | control module | 4 |
| feed cabin | 11 | cover | 12 |
| groove | 121 | hinged portion | 122 |
| button portion | 123 | hinge body | 124 |
| extrusion portion | 125 | movable latch teeth | 126 |
| elastic member | 127 | pressure bearing portion | 128 |
| fixed latch teeth | 129 | drying bin | 13 |
| upper bin body portion | 131 | lower bin body portion | 132 |
| locking portion | 133 | locking body | 134 |

-continued

| Reference number in the drawings: | | | |
|---|---|---|---|
| feed inlet | 21 | feed outlet | 22 |
| pressing area | 1231 | shell | 23 |
| feed distributing cabin | 24 | driving motor | 25 |
| rotating shaft | 26 | hanging buckle member | 201 |
| button | 202 | spring | 203 |
| upper feed distributing area | 241 | lower feed distributing area | 242 |
| block | 243 | accommodating area | 244 |
| fan-shaped annular portion | 245 | fan-shaped annular space | 246 |
| stirring member | 27 | counter | 28 |
| battery compartment | 29 | rotating member | 261 |
| protruding portion | 262 | elastic switch | 281 |
| battery | 291 | plug | 31 |
| mounting plate | 41 | supporting shell | 42 |
| circuit board | 43 | display screen | 44 |
| rotator | 45 | display lens | 46 |
| sensor | 431 | gear | 432 |
| gear teeth | 451 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

FIG. 1 show the structural schematic diagrams of an embodiment of a fully automatic pet feeder of the present invention. Referring to FIG. 1, the present disclosure provides a fully automatic pet feeder, comprising: a storage cabin 1, a feed distributing device 2, a feeding bowl 3, a control module 4.

Wherein the storage cabin 1 is provided with a drying component for maintaining dryness in the storage cabin 1. Exemplarily, the storage cabin 1 adopts a cylindrical structure with a hollow interior for storing pet feed. The drying component is arranged in the storage cabin 1, and is used to remove moisture from the storage cabin 1 and maintain dryness in the storage cabin 1, thereby extending the shelf life of the pet feed in the storage cabin 1, and eliminating the need for the user to frequently add pet feed to the storage cabin 1.

Figure 2:
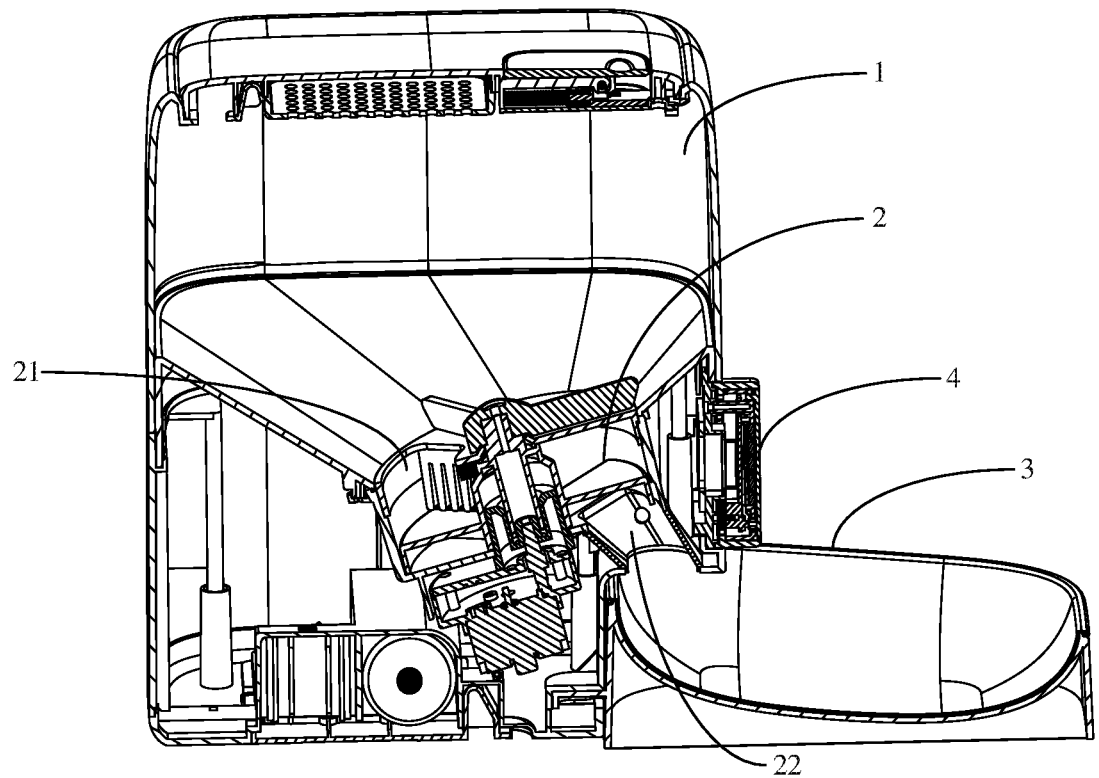
FIG. 2 is a schematic cross-sectional view of an embodiment of the fully automatic pet feeder.

Referring to FIG. 1 and FIG. 2, a feed inlet 21 of the feed distributing device 2 is provided at the bottom of the storage cabin 1 and is connected to the storage cabin 1; the feed distributing device 2 quantitatively separates the pet feed that slides in from the feed inlet 21, and then discharges the separated pet feed from a feed outlet 22 of the feed distributing device 2; specifically, the feed distributing device 2 can separate the pet feed in the storage cabin 1 so that the amount of pet feed discharged from the feed distributing device 2 each time is maintained within a certain range, by controlling the number of times the feed distributing device 2 discharges the pet food, the total amount of pet food added to the feeding bowl 3 during one feeding process can be controlled. For large pets, the feed distributing device 2 can perform multiple feed distribution operations and discharge feed to the feeding bowl 3 multiple times, thereby meeting the feeding needs of large pets; for small pets, the feed distributing device 2 can reduce the number of feed distribution operations and avoid overfeeding.

The feeding bowl 3 is provided adjacent to the feed outlet 22, so that the pet feed discharged from the feed outlet 22 falls into the feeding bowl 3. Exemplarily, the feeding bowl 3 is arranged below the feed outlet 22, after the pet feed in the feed distributing device 2 is quantitatively divided, it slides from the feed outlet 22 into the feeding bowl 3 under the action of gravity.

The control module 4 is electrically connected to the feed distributing device 2, the control module 4 is used to receive external input signals and control the feed distributing device 2 to distribute pet feed in a timely and/or quantitative manner according to the external input signals. The control module 4 can adopt a button input signal mode, and can also establish a remote connection with a mobile terminal to facilitate remote control by users. The control module 4 can set the time and number of times the feed distributing device 2 performs the feed distribution operations according to the external input signal, so as to add pet feed to the feeding bowl 3 in a timely and quantitative manner.

In this embodiment, the fully automatic pet feeder is provided with a drying component in the storage cabin 1, the drying component is used to keep the storage cabin 1 dry, so that the pet feed stored in the storage cabin 1 can be preserved for a long time. Therefore, the user can add a sufficient amount of pet feed to the storage cabin 1 at one time, without the need to frequently add to storage cabin 1, the user's experience is better, even if users travel for many days, they don't need to worry about feeding their pets. Moreover, by setting the feed distributing device 2 and the control module 4, the control module 4 is used to control the operation of the feed distributing device 2. The pet feed in the storage cabin 1 is added to the feeding bowl 3 in a timely and quantitative manner through the feed distributing device 2, thereby achieving timely and quantitative feeding of the pet, and different feeding amounts can be set according to the size of the pet, which is highly practical.

Figure 3:
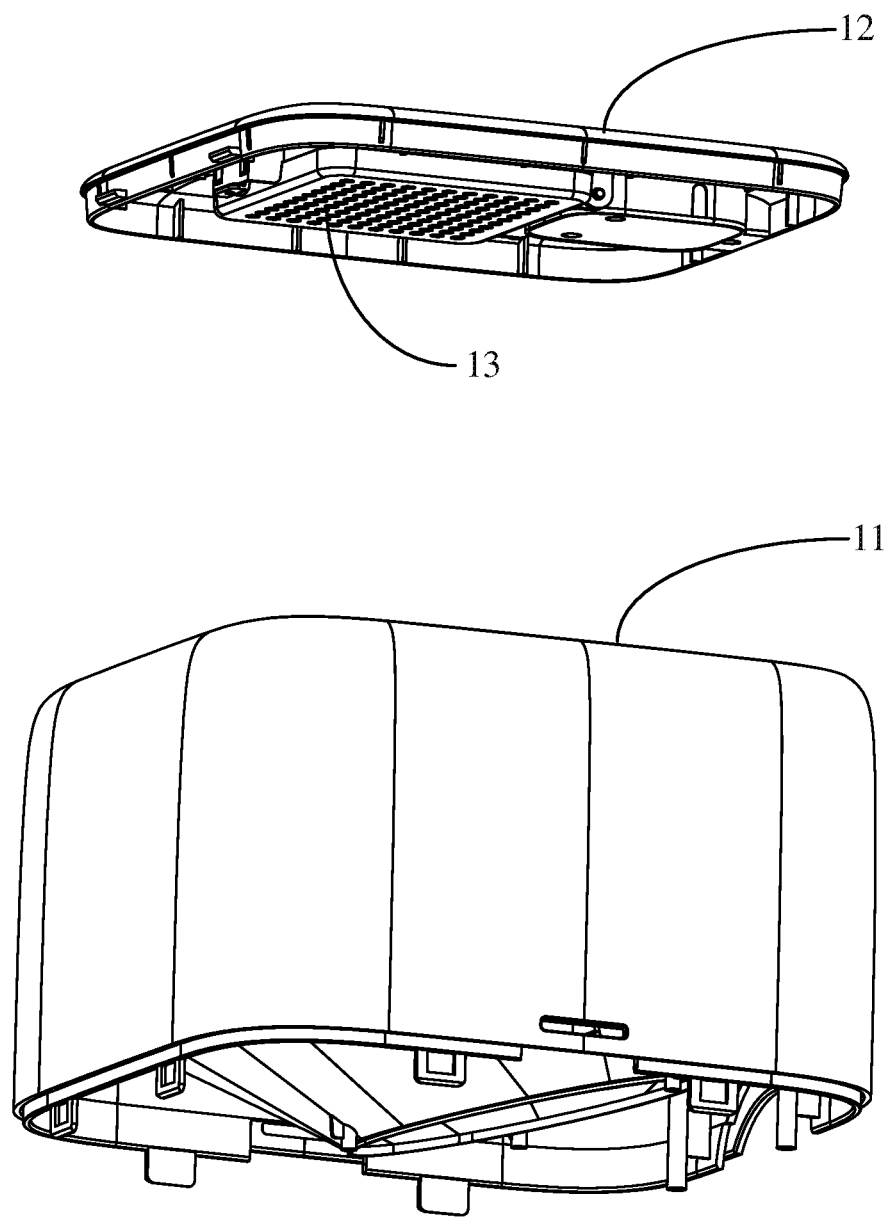
FIG. 3 is a schematic diagram of the exploded structure of a storage cabin of an embodiment of the fully automatic pet feeder.

Furthermore, referring to FIG. 3, the storage cabin 1 comprises a feed cabin 11 with an open top and a cover 12 movably provided on the top of the feed cabin 11, the drying component comprises a drying bin 13 for storing desiccant, the drying bin 13 is provided on the inner wall of the cover 12 and is connected with the feed cabin 11.

Specifically, the cover 12 is movably arranged on the top of the feed cabin 11, the user can remove the cover 12 from the top of the feed cabin 11 and then add pet feed into the feed cabin 11. By arranging the drying bin 13 in the feed cabin 11 and connected with the feed cabin 11, the desiccant is stored in the drying bin 13 and is used to absorb moisture in the feed cabin 11 to keep the feed cabin 11 dry. The setting of the drying bin 13 can not only keep the feed cabin 11 dry, but also prevent the desiccant from directly contacting the pet feed, thereby avoiding the desiccant from contaminating the pet feed.

Figure 4:
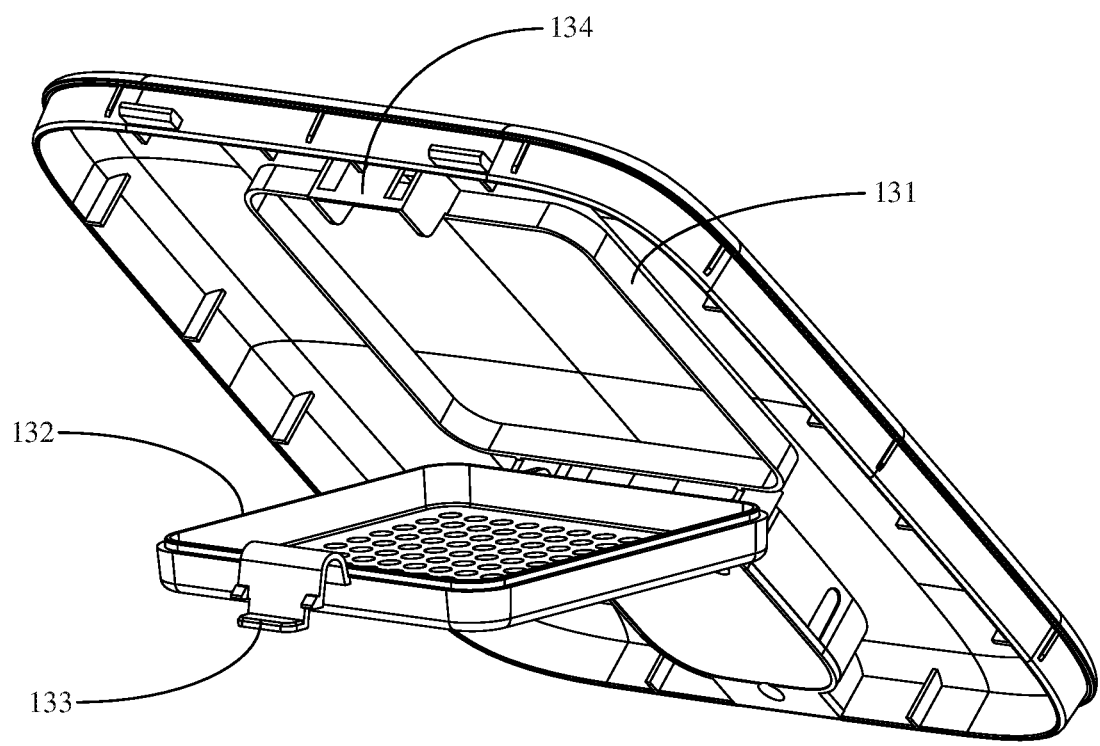
FIG. 4 is a schematic diagram of a cover of an embodiment of the fully automatic pet feeder.

Furthermore, referring to FIG. 4, the drying bin 13 comprises an upper bin body portion 131 fixedly provided on the inner wall of the cover 12 and a lower bin body portion 132 movably provided on the inner wall of the cover 12, one end of the lower bin body portion 132 is hinged to the inner wall of the cover 12, the other end of the lower bin body portion 132 is provided with a locking portion 133, the interior of the cover 12 is provided with a locking body 134 matching the locking portion 133, the lower bin body portion 132 is provided with a plurality of ventilation ports connecting with the feed cabin 11 and the drying bin 13.

Specifically, in order to facilitate the replacement of the desiccant in the drying bin 13, in this embodiment, one end of the lower bin body portion 132 is hinged to the inner wall of the top of the cover 12, and a locking portion 133 is provided at the other end, after the desiccant is placed in the drying bin 13, the lower bin body portion 132 is rotated so that the locking portion 133 is locked into the locking body 134 on the top inner wall of the cover 12. When the desiccant needs to be replaced, the locking portion 133 is pulled out from the locking body 134 and the lower bin body portion 132 is rotated, so that the drying bin 13 can be opened to replace the desiccant.

Figure 5:
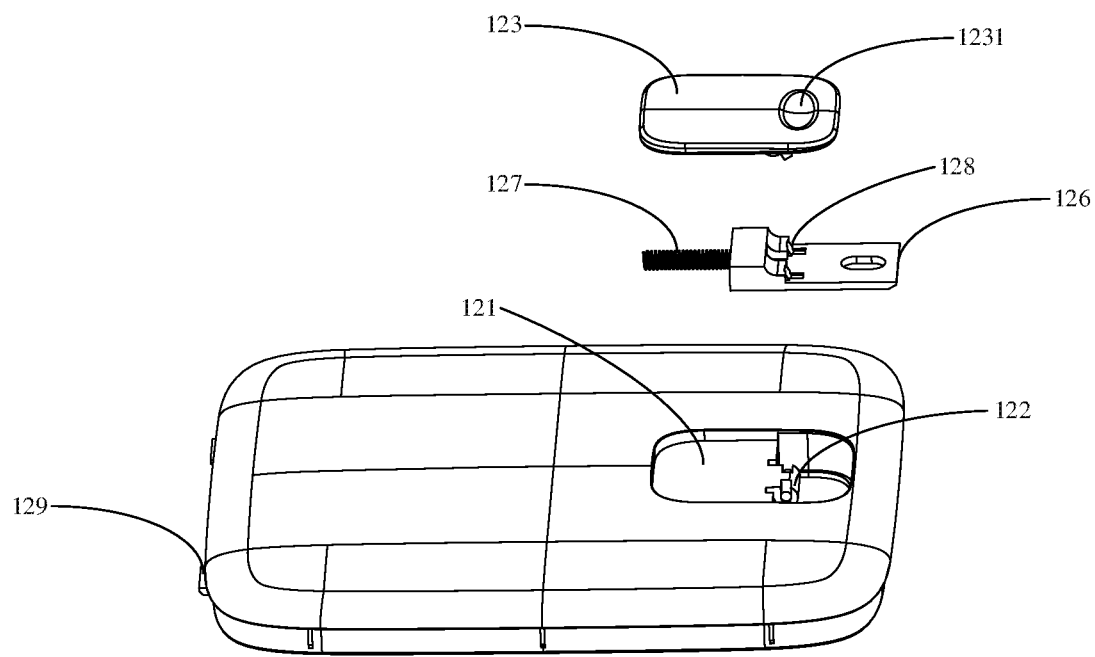
FIG. 5 is a schematic diagram of the exploded structure of a cover of an embodiment of the fully automatic pet feeder.
Figure 6:
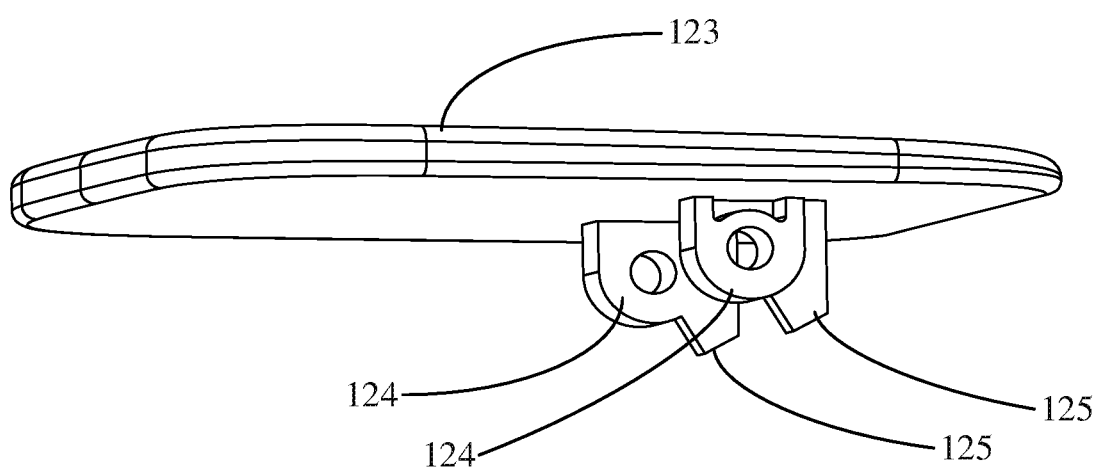
FIG. 6 is a schematic diagram of a button portion of an embodiment of the fully automatic pet feeder.

Furthermore, referring to FIG. 5 and FIG. 6, the cover 12 is also provided with a groove 121 with an open top, the groove 121 is provided with a hinged portion 122, the top of the groove 121 is provided with a matching button portion 123, the button portion 123 matches the shape and size of the groove 121, the upper surface of the button portion 123 is provided with a pressing area 1231, the lower surface of the button portion 123 is provided with a hinge body hinged to the hinge portion, when the user presses the pressing area 1231 on the upper surface of the button portion 123, the button portion 123 rotates with the hinge portion 122 as a fulcrum. The hinge body 124 is provided with an extrusion portion 125, the bottom of the groove 121 is slidably provided with movable latch teeth 126, the side wall of the groove 121 is provided with a through hole (not shown in the figure), one end of the movable latch teeth 126 extends from the through hole to the outside of the groove 121, an elastic member 127 is provided between the other end of the movable latch teeth 126 and the inner wall of the groove 121, the upper surface of the movable latch teeth 126 is provided with a pressure bearing portion 128, the extrusion portion 125 abuts against the pressure bearing portion 128, the button portion 123 rotates when pressed, the extrusion portion 125 rotates and presses the pressure bearing portion 128 to drive the movable latch teeth 126 to slide; the movable latch teeth 126 slides so that one end of the movable latch teeth 126 retracts from the outside of the groove 121 to the inside of the groove 121, when the button portion 123 is released, the movable latch teeth 126 returns to its original position under the elastic force of the elastic member 127, one end of the movable latch teeth 126 extends out from the groove 121, the side wall of the feed cabin 11 is provided with a first bayonet (not shown in the figure) matched with one end of the movable latch teeth 126, the first bayonet is opposite to the through hole on the side wall of the groove 121.

Figure 7:
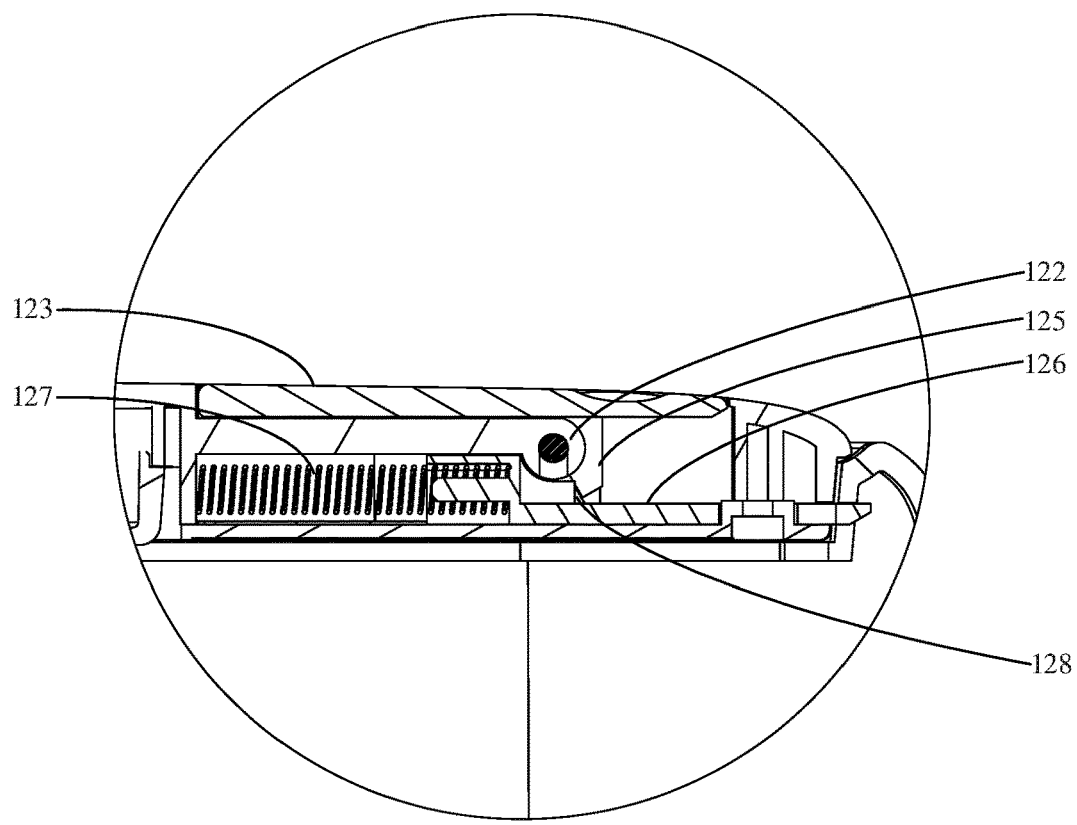
FIG. 7 is a schematic diagram of a partial cross-sectional structure of an embodiment of the fully automatic pet feeder when the button portion is not pressed.
Figure 8:
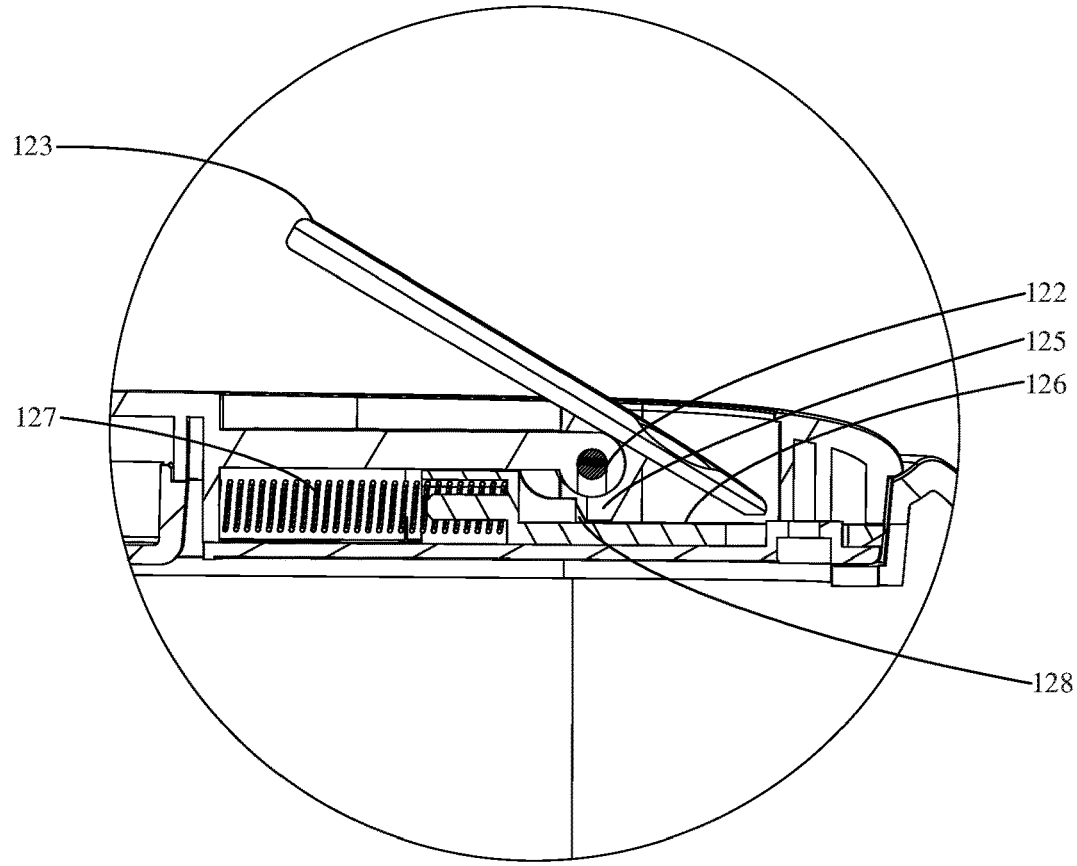
FIG. 8 is a schematic diagram of a partial cross-sectional structure of an embodiment of the fully automatic pet feeder when the button portion is pressed.

Specifically, referring to FIG. 7 and FIG. 8, FIG. 7 is a schematic diagram of the cross-sectional structure of the cover 12 when it is closed. FIG. 8 is a schematic diagram of the cross-sectional structure when the cover 12 is opened. When the user needs to open the cover 12 to add pet food to the feed cabin 11, the user presses the pressing area 1231 on the button portion 123, the button portion 123 rotates with the hinge portion 122 as a fulcrum under the action of external force, the extrusion portion 125 begins to press the pressure bearing portion 128, causing the movable latch teeth 126 to slide, one end of the movable latch teeth 126 that is inserted into the side wall of the feed cabin 11 is retracted into the groove 121, the feed cabin 11 and the cover 12 are no longer engaged, so it is convenient for the user to remove the cover 12. When the cover 12 is installed back on the top of the feed cabin 11, the cover 12 is placed on the top of the feed cabin 11, then press the pressing area 1231 of the button portion 123, the end of the movable latch teeth 126 is retracted into the groove 121 and is opposite to the first bayonet on the side wall of the feed cabin 11, when the user stops pressing the button portion 123, under the elastic force of the elastic member 127, the movable latching teeth 126 slides, and the end of the movable latching teeth 126 extends out from the through hole on the side wall of the groove 121 and is latched into the first bayonet on the side wall of the feed cabin 11.

Furthermore, referring to FIG. 5, the side wall of the cover 12 is also provided with fixed latch teeth 129, the fixed latch teeth 129 is provided at an end opposite to the movable latch teeth 126, the side wall of the feed cabin 11 is also provided with a second bayonet matched with the fixed latch teeth 129.

Specifically, when the cover 12 is installed back on the top of the feed cabin 11, now insert the fixed latch teeth 129 into the second bayonet, and then press the button portion 123 to insert the movable latch teeth 126 into the first bayonet; when it is necessary to remove the cover 12, firstly, press the button portion 123 to remove the movable latch teeth 126 from the first bayonet, and then remove the fixed latch teeth 129 from the second bayonet.

Furthermore, referring to FIG. 2 and FIG. 3, the bottom of the storage cabin 1 is provided obliquely, and the feed inlet 21 is provided at the lowest point of the bottom of the storage cabin 1.

Specifically, the bottom of the storage cabin 1 is provided obliquely and the feed inlet 21 is provided at the lowest point of the bottom of the storage cabin 1, so that the pet feed in the storage cabin 1 slides into the feed distributing device 2 from the feed inlet 21 under the action of gravity.

Furthermore, referring to FIG. 9 to FIG. 13, the feed distributing device 2 comprises a shell 23, a cylindrical feed distributing cabin 24 provided in the shell 23, a driving motor 25 and a rotating shaft 26, the feed distributing cabin 24 is connected to the bottom of the storage cabin 1, the driving motor 25 is provided at the bottom end of the feed distributing cabin 24, the rotating shaft 26 is provided at the center of the feed distributing cabin 24, and the bottom end of the rotating shaft 26 passes through the bottom end of the feed distributing cabin 24 and is connected to the output end of the driving motor 25, the feed inlet 21 is provided at the top of the feed distributing cabin 24, the feed outlet 22 is provided at the bottom of the feed distributing cabin 24, the feed distributing cabin 24 comprises an upper feed distributing area 241 connected to the feed inlet 21 and a lower feed distributing area 242 connected to the feed outlet 22, the upper feed distributing area 241 is provided with a pair of blocks 243, the pair of blocks 243 are connected to the inner wall of the top of the feed distributing cabin 24 and are located at both ends of the feed inlet 21, the pair of blocks 243, the inner wall of the feed distributing cabin 24, and the outer wall of the rotating shaft 26 form a fan-shaped annular accommodating area 244, the lower feed distributing area 242 is provided with a pair of fan-shaped annular portions 245, the pair of fan-shaped annular portions 245 are sleeved on the rotating shaft 26, the pair of fan-shaped annular portions 245 divide the lower feed distributing area 242 into two fan-shaped annular spaces 246 of equal size, the top surface area of the fan-shaped annular spaces 246 are equal to the bottom surface area of the accommodating area 244, the bottom area of the fan-shaped annular spaces 246 are equal to the size of the feed outlet 22, when the rotating shaft 26 drives the pair of fan-shaped annular portions 245 to rotate, the two fan-shaped annular spaces 246 are alternately passed below the accommodating area 244 or above the feed outlet 22, so that the pet feed in the accommodating area 244 falls into the fan-shaped annular space 246, or the pet feed in the fan-shaped annular space 246 falls from the feed outlet 22 to the feeding bowl 3.

Figure 12:
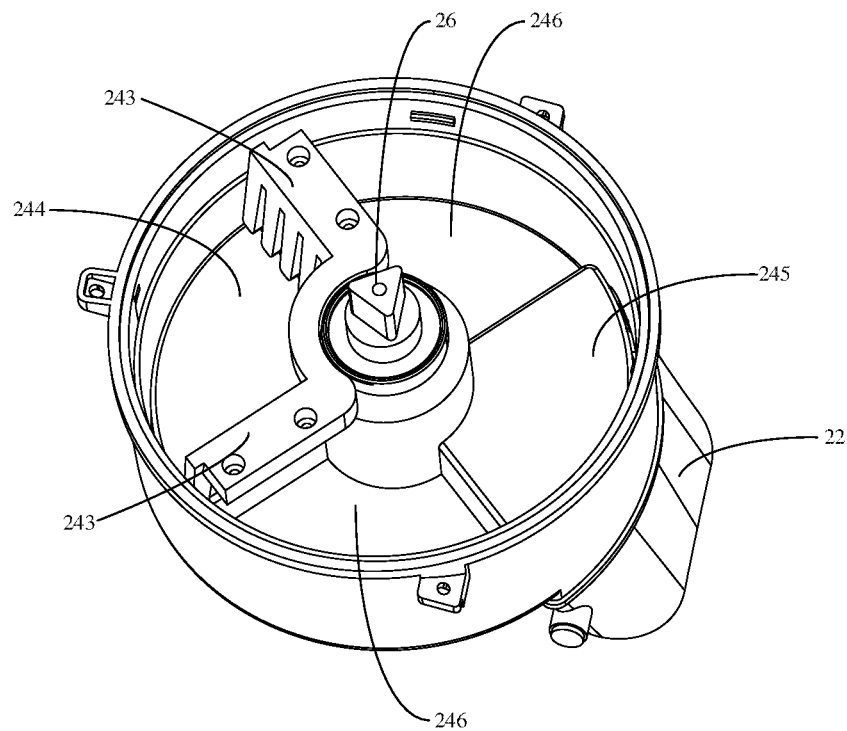
FIG. 12 is a schematic diagram of an embodiment of a feed cabin of a fully automatic pet feeder.
Figure 13:
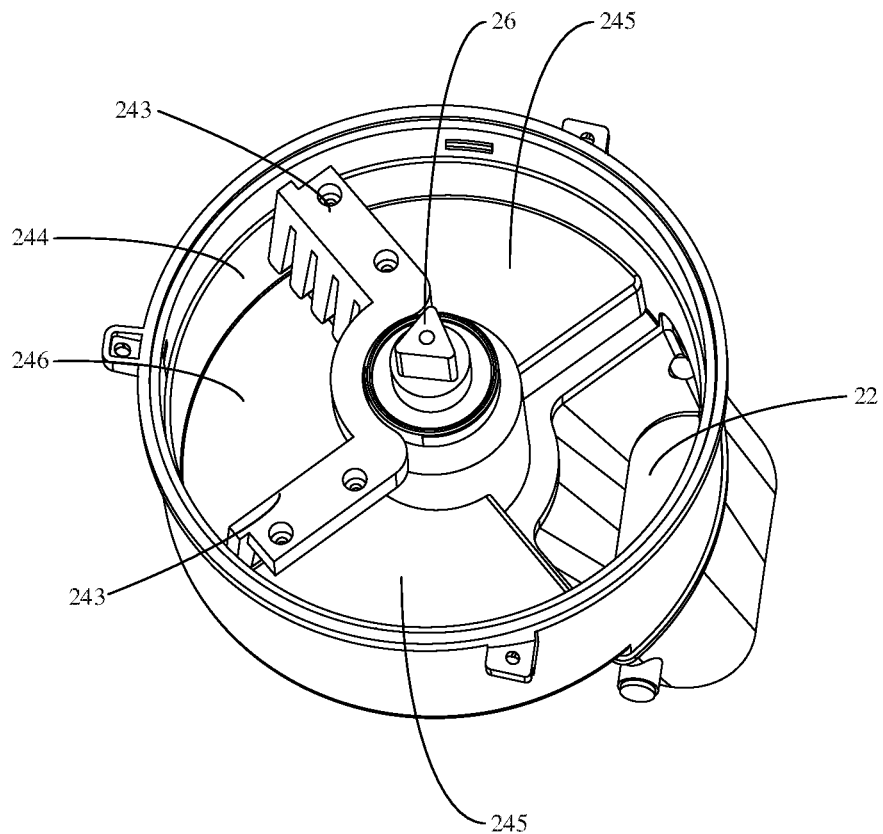
FIG. 13 is another schematic diagram of an embodiment of a feed cabin of a fully automatic pet feeder.

Specifically, referring to FIG. 12, in the initial state, the pair of fan-shaped annular portions 245 rotate until one of the fan-shaped annular portions 245 is directly below the accommodating area 244, at this time, the bottom end of the accommodating area 244 is closed by the fan-shaped annular portions 245, and the pet feed that has fallen into the storage cabin 1 is in the accommodating area 244. When the pet needs to be fed, the control module 4 controls the driving motor 25 to work, the driving motor 25 drives the rotating shaft 26 to rotate, and the rotating shaft 26 drives the pair of fan-shaped annular portions 245 to rotate, the fan-shaped annular portion 245 at the bottom of the accommodating area 244 rotates away from the bottom of the accommodating area 244, and the fan-shaped annular spaces 246 gradually rotates to the bottom of the accommodating area 244, as the fan-shaped annular portion 245 rotates away, the pet feed in the accommodating area 244 falls into the fan-shaped annular space 246 under the blocking effect of the blocks 243, until the fan-shaped annular space 246 is filled, the rotating shaft 26 continues to rotate, another fan-shaped annular portions 245 is rotated to the bottom of the accommodating area 244, and the filled fan-shaped annular space 246 is rotated away from the bottom of the accommodating area 244. Furthermore, under the blocking effect of the blocks 243, the pet feed that exceeds the top of the fan-shaped annular space 246 is blocked in the accommodating area 244, thereby separating the pet feed that fills one of the fan-shaped annular space 246; when the rotating shaft 26 continues to rotate, as shown in FIG. 13, until the filled fan-shaped annular space 246 is above the feed outlet 22, the pet feed in the fan-shaped annular space 246 slides down from the feed outlet 22 to the feeding bowl 3 under the action of gravity. By controlling the number of revolutions of the rotating shaft 26, the feed distributing device 2 can be controlled to discharge pet feed in a quantitative manner, thereby achieving quantitative feeding of the pet. For example, the rotating shaft 26 is controlled to rotate half a circle, so the pet food in the amount of one fan-shaped annular space 246 can be discharged into the feeding bowl 3. The rotating shaft 26 rotates one circle, so the pet feed in the amount of two fan-shaped annular spaces 246 can be discharged. The rotating shaft 26 rotates one and a half circle, so the pet feed in the amount of three fan-shaped annular spaces 246 can be discharged.

Furthermore, the feed distributing device 2 also comprises a stirring member 27, the top end of the rotating shaft 26 passes through the top of the feed distributing cabin 1 and extends into the storage cabin 1, the stirring member 27 is connected to the top end of the rotating shaft 26.

Specifically, by providing the stirring member 27, when the rotating shaft 26 rotates to separate the pet feed, the stirring member 27 simultaneously stirs the pet feed in the storage cabin 1, making it easier for the pet feed to fall into the feed distributing cabin 24 from the feed inlet 21, thereby preventing the pet feed from blocking the feed inlet 21.

Figure 14:
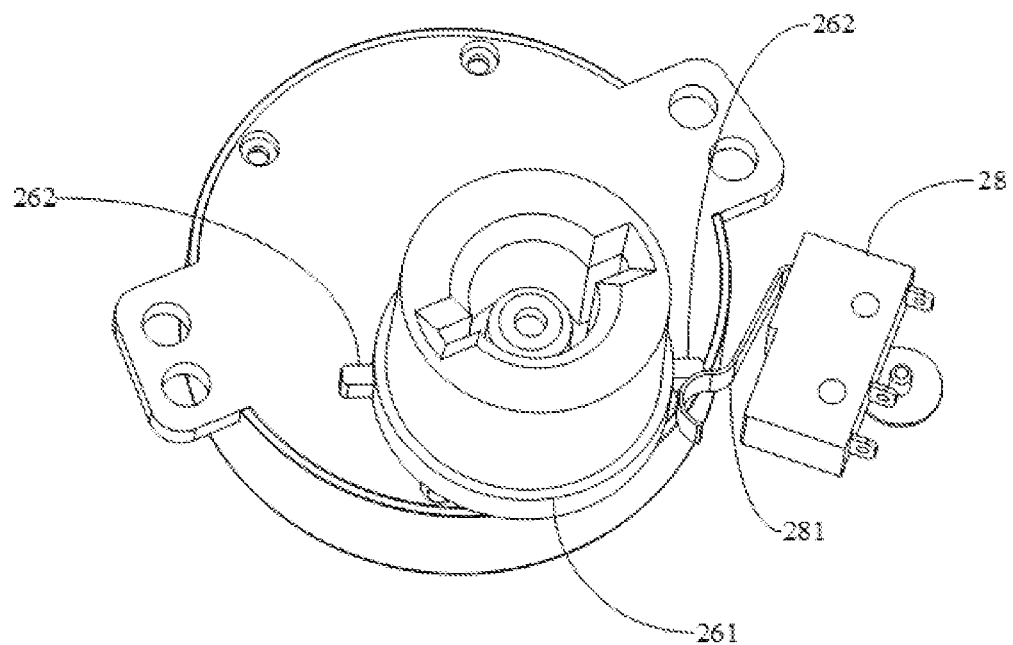
FIG. 14 is another partial structural schematic diagram of a feed distributing device of an embodiment of the fully automatic pet feeder.

Furthermore, referring to FIG. 14, the feed distributing device 2 also comprises a counter 28 electrically connected to the control module 4, the counter 28 is provided on the outer surface of the bottom of the feed distributing cabin 24, a rotating member 264 is sleeved on a part of rotating shaft 26 area between the bottom of the feed distributing cabin 24 and the driving motor 25, the rotating member 264 is provided with a protruding portion 262, the counter 28 is provided with an elastic switch 281, the elastic switch 281 is located on the rotation track of the protruding portion 262, when the rotating member 261 drives the protruding portion 262 to rotate and pass the elastic switch 281, the protruding portion 262 presses the elastic switch 281, and the counter 28 generates an induction signal and counts once.

Specifically, the number of protruding portions 262 on the rotating member 261 is preferably two and symmetrically arranged on the side surface of the rotating member 261 to correspond to the two fan-shaped annular spaces 246. In the initial state, one of the protruding portions 262 abuts against the elastic switch 281, and the count times of the counter 28 are reset to zero. When the control module 4 controls the rotating shaft 26 to rotate, the protruding portion 262 presses the elastic switch 281, and the elastic switch 281 is deformed so that the elastic switch 281 is turned on. The counter 28 generates a corresponding induction signal and counts once until another protruding portion 262 abuts against the elastic switch 281. At this time, the rotating shaft 26 has rotated half a circle, and the amount of pet feed in one fan-shaped annular space 246 has been discharged into the feeding bowl 3. When the control module 4 controls the rotating shaft 26 to continue rotating, the other protruding portion 262 presses the elastic switch 281, the counter 28 generates an induction signal and counts twice, and so on, according to the count of the counter 28, the amount of pet feed discharged into the feeding bowl 3 can be known, the counted times are transmitted to the control module 4, and the control module 4 can control the operation of the driving motor 25 according to the counted times.

Figure 9:
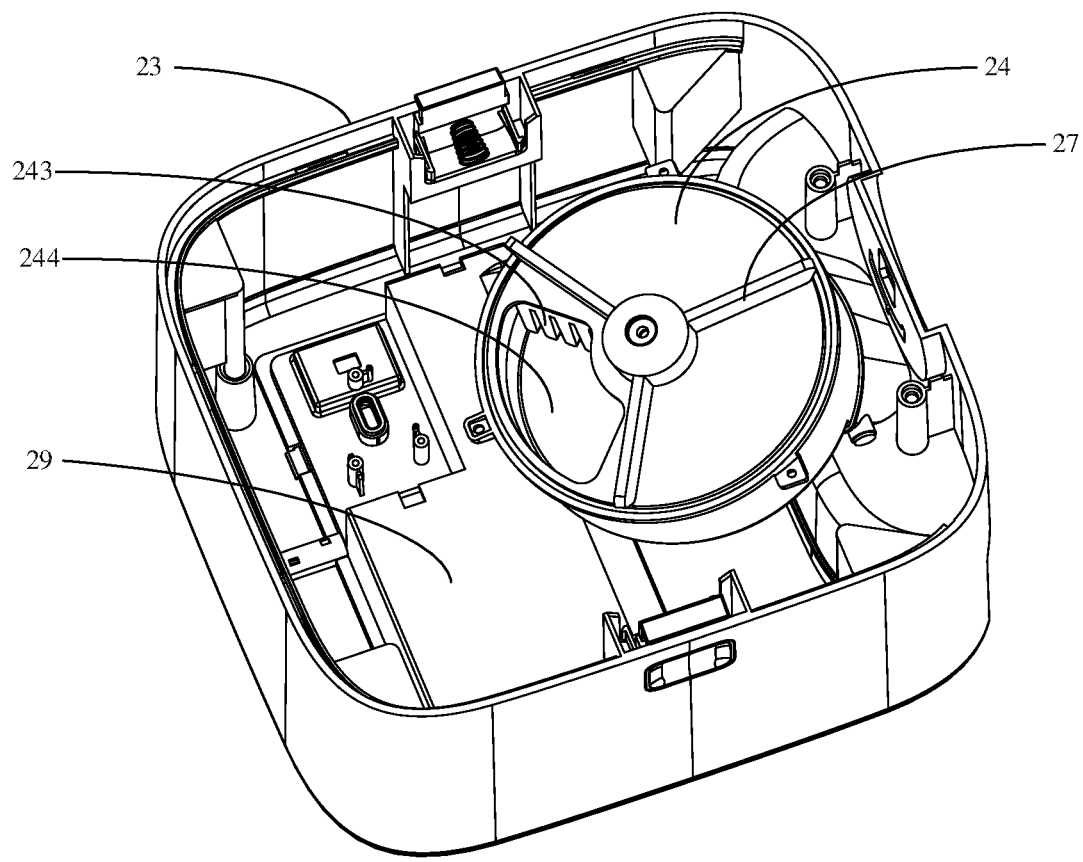
FIG. 9 is a schematic diagram of a feed distributing device of an embodiment of the fully automatic pet feeder.
Figure 10:
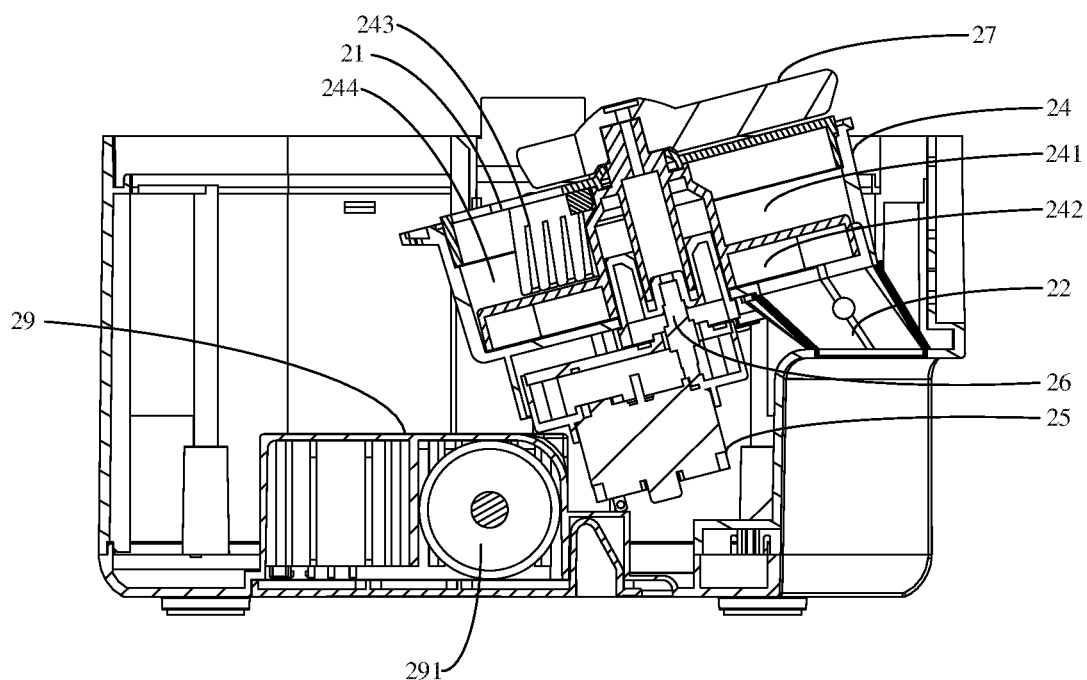
FIG. 10 is a schematic cross-sectional view of a feed distributing device of the fully automatic pet feeder.
Figure 11:
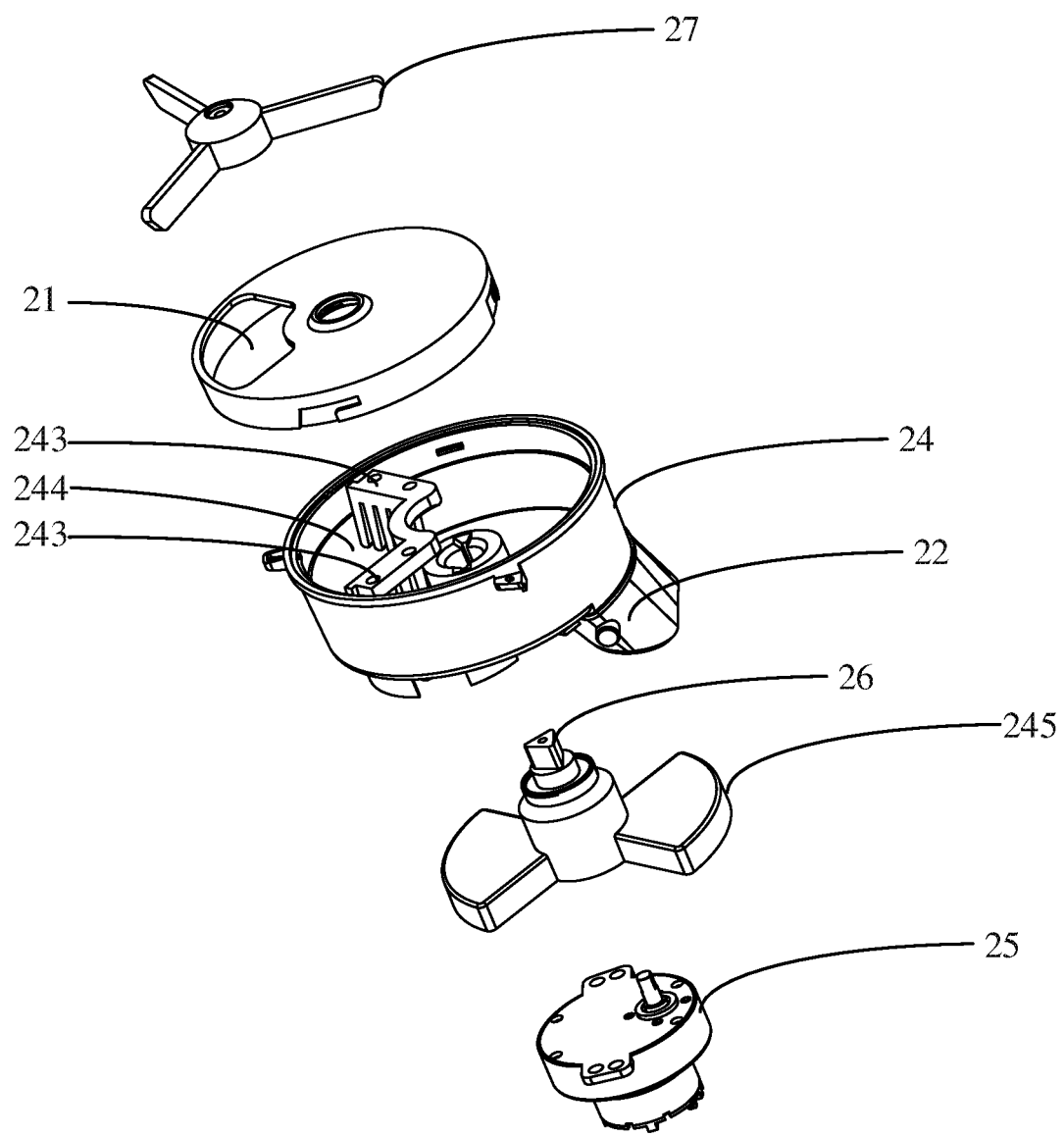
FIG. 11 is a schematic diagram of a partial exploded structure of a feed distributing device of an embodiment of the fully automatic pet feeder.

Furthermore, referring to FIG. 9 and FIG. 10, the shell 23 is also provided with a battery compartment 29, the battery compartment 29 is loaded with a battery 291, the battery 291 is electrically connected to the driving motor 25 and the control module 4.

Specifically, the battery 291 is used to supply power to the control module 4 and the feed distributing device 2. The battery 291 may be a rechargeable battery or a non-rechargeable battery, which is not limited in this embodiment.

Figure 15:
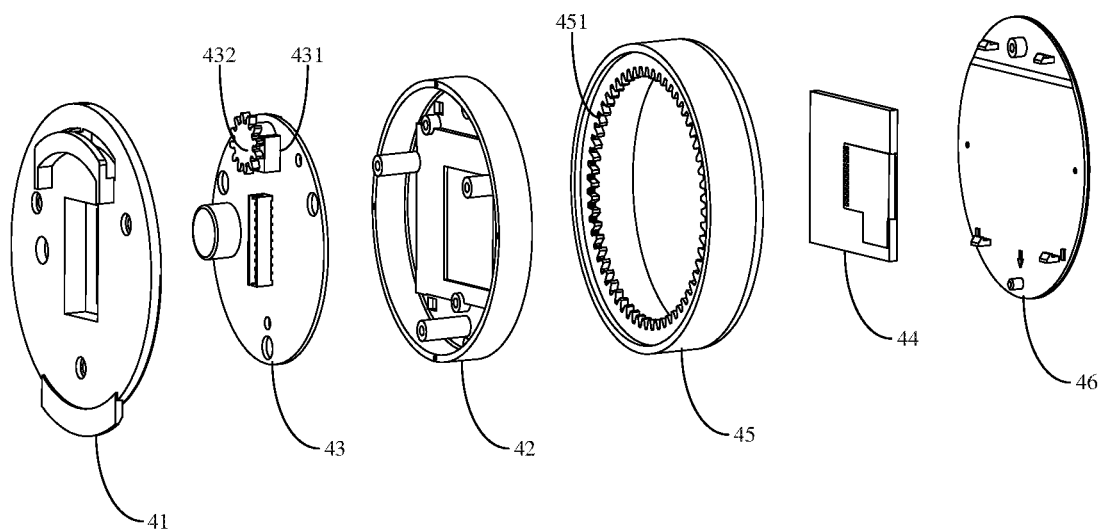
FIG. 15 is a schematic diagram of the exploded structure of a control module of an embodiment of the fully automatic pet feeder.

Furthermore, referring to FIG. 15, the control module 4 comprises a mounting plate 41, a supporting shell 42, a circuit board 43, a display screen 44 and a rotator 45, the shell 23 is provided with a mounting structure (not shown in the figure) matching the mounting plate 41, one side of the supporting shell 42 is arranged on the mounting plate 41, the circuit board 43 is arranged in the supporting shell 42, the display screen 44 is arranged on the other side of the supporting shell 42, the display screen 42 is covered with a layer of display lens 46, the display lens 46 is provided with a sensing button (not shown in the figure), the sensing button is electrically connected to the circuit board 43, the rotator 45 is movably sleeved on the supporting shell 42, the circuit board 43 is provided with a sensor 431, the sensor 431 is provided with a gear 432, the inner surface of the rotator 45 is provided with a circle of gear teeth 451 which meshes with the gear 432, the rotator 45 rotates to drive the gear 432, the gear 432 rotates so that the sensor 431 generates a control signal and transmits it to the circuit board 43, the circuit board 43 is electrically connected to the driving motor 25.

Specifically, the rotator 45 is rotated to drive the gear 432 to rotate, and the rotation of the gear 432 drives the signal sensing end of the sensor 431 to rotate, a corresponding sensing signal is generated in the sensor 431, function control can be implemented according to the sensing signal, such as realizing the screen switching function, by switching different function interfaces displayed on the display screen 44 through the rotator 45. Compared with the traditional function button method, the way in which the rotator 45 realizes the function is more interesting.

Figure 16:
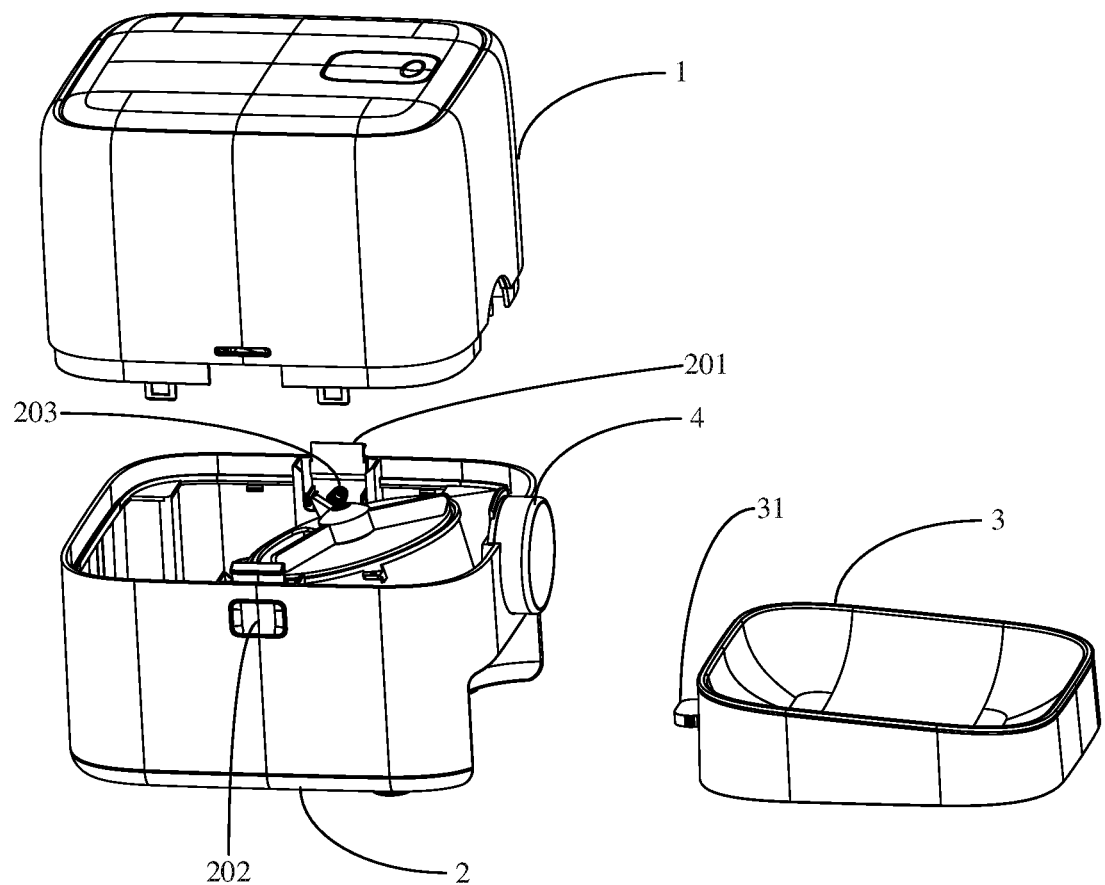
FIG. 16 is a schematic structural diagram of another embodiment of the fully automatic pet feeder.

Furthermore, referring to FIG. 16, the feeding bowl is detachably connected to the feed distributing device.

Specifically, in order to facilitate the cleaning of the feeding bowl 3, in this embodiment, the feeding bowl 3 and the feed distributing device 2 are detachably connected. Exemplarily, a plug 31 can be provided on the side wall of the feeding bowl 3, and a groove structure (not shown in the figure) can be provided on the plug 31, the shell 23 of the feed distributing device 2 is provided with a socket (not shown in the figure) matching with the plug 31, the socket is provided with a limiting protrusion (not shown in the figure) matching the groove structure, when the plug 31 is inserted into the socket, the limiting protrusion engages with the groove structure to fix the feeding bowl 3 and the feed distributing device 2.

Furthermore, referring to FIG. 16, the storage cabin is detachably connected to the feed distributing device.

Exemplarily, hanging buckle member 201 can be provided on both sides of the feed distributing device 2, hanging buckle portion of the hanging buckle member 201 extends from the top of the feed distributing device 2, buttons 202 are also provided on both sides of the feed distributing device 2, and the buttons 202 are connected to the hanging buckle member 201, a limiting portion (not shown in the figure) is also provided on the bottom surface of the storage cabin 1, the limiting portion is opposite to the inner surface of the button 202, and a spring 203 is arranged between the inner surface of the button 202 and the limiting portion, two buckle grooves 101 are correspondingly arranged on both sides of the storage cabin 1, and the buckle grooves 101 match the hanging buckle portion, when the storage cabin 1 is mounted on the feed distributing device 2, the hanging buckle portion is inserted into the buckle grooves 101 to fix the storage cabin 1 and the feed distributing device 2; when the storage cabin 1 needs to be removed, the buttons 202 on both sides of the feed distributing device 2 are pressed simultaneously, the button 202 moves into the feed distributing device 2, driving the hanging buckle member 201 to move into the feed distributing device 2, so that the hook part is separated from the buckle grooves 101, the storage cabin 1 can now be removed. When installing the storage cabin 1 onto the feed distributing device 2, firstly, it is also necessary to press the buttons 202 on both sides, after placing the storage cabin 1 on top of the feed distributing device 2, release the button 202, under the action of the spring 203, the button moves outward from the feed distributing device 2, driving the hanging buckle member 201 to move, and the hanging buckle portion is inserted into the buckle grooves 101.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A fully automatic pet feeder, comprising: a storage cabin, a feed distributing device, a feeding bowl, a control module; wherein:
    the storage cabin is provided with a drying component for maintaining dryness in the storage cabin;
    a feed inlet of the feed distributing device is provided at the bottom of the storage cabin and is connected to the storage cabin, the feed distributing device quantitatively separates the pet feed that slides in from the feed inlet, and then discharges the separated pet feed from a feed outlet of the feed distributing device;
    the feeding bowl is provided adjacent to the feed outlet, so that the pet feed discharged from the feed outlet falls into the feeding bowl;
    the control module is electrically connected to the feed distributing device, the control module is used to receive external input signals and control the feed distributing device to distribute pet feed in a timely and/or quantitative manner according to the external input signals;
    the feed distributing device comprises a shell, a cylindrical feed distributing cabin provided in the shell, a driving motor and a rotating shaft;
    the feed distributing cabin is connected to the bottom of the storage cabin, the driving motor is provided at the bottom end of the feed distributing cabin, the rotating shaft is provided at the center of the feed distributing cabin, and the bottom end of the rotating shaft passes through the bottom end of the feed distributing cabin and is connected to the output end of the driving motor;
    the feed inlet is provided at the top of the feed distributing cabin, and the feed outlet is provided at the bottom of the feed distributing cabin;
    the feed distributing cabin comprises an upper feed distributing area connected to the feed inlet and a lower feed distributing area connected to the feed outlet,
    the upper feed distributing area is provided with a pair of blocks, and the pair of blocks are connected to the inner wall of the top of the feed distributing cabin and are located at both ends of the feed inlet;
    the pair of blocks, the inner wall of the feed distributing cabin and the outer wall of the rotating shaft form a fan-shaped annular accommodating area;
    the lower feed distributing area is provided with a pair of fan-shaped annular portions, the pair of fan-shaped annular portions are sleeved on the rotating shaft, and the pair of fan-shaped annular portions divide the lower feed distributing area into two fan-shaped annular spaces of equal size,
    the top surface area of the fan-shaped annular spaces is equal to the bottom surface area of the accommodating area, and the bottom area of the fan-shaped annular spaces is equal to the size of the feed outlet;
    when the rotating shaft drives the pair of fan-shaped annular portions to rotate, the two fan-shaped annular spaces are alternately passed below the accommodating area or above the feed outlet, so that the pet feed in the accommodating area falls into the fan-shaped annular space, or the pet feed in the fan-shaped annular space falls from the feed outlet to the feeding bowl;
    the feed distributing device further comprises a stirring member, the top end of the rotating shaft passes through the top of the feed distributing cabin and extends into the storage cabin, and the stirring member is connected to the top end of the rotating shaft;
    the feed distributing device also comprises a counter electrically connected to the control module, and the counter is provided on the outer surface of the bottom of the feed distributing cabin;
    a rotating member is sleeved on a part of rotating shaft area between the bottom of the feed distributing cabin and the driving motor, and the rotating member is provided with a protruding portion;
    the counter is provided with an elastic switch, the elastic switch is located on the rotation track of the protruding portion; and when the rotating member drives the protruding portion to rotate and pass the elastic switch, the protruding portion presses the elastic switch, and the counter generates an induction signal and counts once.

2. The fully automatic pet feeder of claim 1, wherein the storage cabin comprises a feed cabin with an open top and a cover movably provided on the top of the feed cabin; and wherein the drying component comprises a drying bin for storing desiccant, and the drying bin is provided on the inner wall of the cover and is connected with the feed cabin.

3. The fully automatic pet feeder of claim 2, wherein the drying bin comprises an upper bin body portion fixedly provided on the inner wall of the cover and a lower bin body portion movably provided on the inner wall of the cover;

wherein one end of the lower bin body portion is hinged to the inner wall of the cover, and the other end of the lower bin body portion is provided with a locking portion;

wherein the interior of the cover is provided with a locking body matching the locking portion; and wherein the lower bin body portion is provided with a plurality of ventilation ports connecting with the feed cabin and the drying bin.

4. The fully automatic pet feeder of claim 2, wherein the cover further provided with a groove with an open top, the groove is provided with a hinged portion, and the top of the groove is provided with a matching button portion;

the lower surface of the button portion is provided with a hinge body hinged to the hinge portion;

the hinge body is provided with an extrusion portion;

the bottom of the groove is slidably provided with movable latch teeth, the side wall of the groove is provided with a through hole, one end of the movable latch teeth extends from the through hole to the outside of the groove, and an elastic member is provided between the other end of the movable latch teeth and the inner wall of the groove;

the upper surface of the movable latch teeth is provided with a pressure bearing portion, the extrusion portion abuts against the pressure bearing portion;

the button portion rotates when being pressed, the extrusion portion rotates and presses the pressure bearing portion to drive the movable latch teeth to slide; and the movable latch teeth slide so that one end of the movable latch teeth retracts from the outside of the groove to the inside of the groove; and when the button portion is released, the movable latch teeth returns to its original position under the elastic force of the elastic member, one end of the movable latch teeth extends out from the groove.

5. The fully automatic pet feeder of claim 4, wherein the side wall of the cover is provided with fixed latch teeth, and the fixed latch teeth are provided at an end opposite to the movable latch teeth.

6. The fully automatic pet feeder of claim 1, wherein the feed distributing device further comprises a stirring member;

the top end of the rotating shaft passes through the top of the feed distributing cabin and extends into the storage cabin; and the stirring member is connected to the top end of the rotating shaft.

7. The fully automatic pet feeder of claim 1, wherein the shell comprises a battery compartment, the battery compartment is loaded with a battery, and the battery is electrically connected to the driving motor and the control module.

8. The fully automatic pet feeder of claim 1, wherein the control module comprises a mounting plate, a supporting shell, a circuit board, a display screen and a rotator;

the shell is provided with a mounting structure matching the mounting plate;

one side of the supporting shell is arranged on the mounting plate, the circuit board is arranged in the supporting shell, and the display screen is arranged on the other side of the supporting shell;

the display screen is covered with a layer of display lens, the display lens is provided with a sensing button, and the sensing button is electrically connected to the circuit board;

the rotator is movably sleeved on the supporting shell, the circuit board is provided with a sensor, the sensor is provided with a gear, and the inner surface of the rotator is provided with a circle of gear teeth meshed with the gear;

the rotator rotates to drive the gear, the gear rotates so that the sensor generates a control signal and transmits it to the circuit board; and the circuit board is electrically connected to the driving motor.

9. The fully automatic pet feeder of claim 1, wherein the feeding bowl is detachably connected to the feed distributing device.

10. The fully automatic pet feeder of claim 1, wherein the storage cabin is detachably connected to the feed distributing device.

* * * * *